US012719555B2

(12) United States Patent
Li et al.

(10) Patent No.: US 12,719,555 B2
(45) Date of Patent: Aug. 25, 2026

(54) COMMON TCI STATE FOR APPLICATION ACROSS MULTIPLE CONFIGURED COMPONENT CARRIERS IN CARRIER AGGREGATION

(71) Applicant: Intel Corporation, Santa Clara, CA (US)

(72) Inventors: Hua Li, Beijing (CN); Meng Zhang, Beijing (CN); Andrey Chervyakov, Maynooth (IE); Rui Huang, Beijing (CN); Ilya Bolotin, Nizhny-Novgorod (RU)

(73) Assignee: Intel Corporation, Santa Clara, CA (US)

( * ) Notice: Subject to any disclaimer, the term of this patent is extended or adjusted under 35 U.S.C. 154(b) by 239 days.

(21) Appl. No.: 18/723,940

(22) PCT Filed: Feb. 8, 2023

(86) PCT No.: PCT/US2023/012605
§ 371 (c)(1),
(2) Date: Jun. 25, 2024

(87) PCT Pub. No.: WO2023/154331
PCT Pub. Date: Aug. 17, 2023

(65) Prior Publication Data

US 2025/0070849 A1 Feb. 27, 2025

Related U.S. Application Data

(60) Provisional application No. 63/309,319, filed on Feb. 11, 2022.

(51) Int. Cl.
*H04B 7/06* (2006.01)
*H04B 17/318* (2015.01)
(Continued)

(52) U.S. Cl.
CPC ....... *H04B 7/06968* (2023.05); *H04B 17/328* (2023.05); *H04L 5/0055* (2013.01); *H04W 36/00692* (2023.05)

(58) Field of Classification Search
CPC . H04B 7/06968; H04B 17/328; H04L 5/0055; H04L 5/0092; H04L 5/001;
(Continued)

(56) References Cited

U.S. PATENT DOCUMENTS

2021/0266844 A1 8/2021 Zhou et al.
2022/0394548 A1* 12/2022 Huang .................. H04W 72/23
(Continued)

FOREIGN PATENT DOCUMENTS

CA 3135038 A1 * 10/2020 ........... H04L 1/1812
CA 3151522 A1 * 2/2021 ............ H04W 72/23
(Continued)

OTHER PUBLICATIONS

"International Application Serial No. PCT/US2023/012605, International Search Report mailed May 30, 2023", 3 pgs.
(Continued)

*Primary Examiner* — Michael A Keller
(74) *Attorney, Agent, or Firm* — Schwegman Lundberg & Woessner, P.A.

(57) ABSTRACT

An apparatus and system of establishing a Transmission Configuration Indication (TCI) state switch delay are described. The TCI state switch delay for a reference signal (RS) on a component carrier (CC) in intra-band carrier aggregation (CA) is dependent on whether a TCI state indicated in the DCI is known based on a type of Quasi Co-Location (QCL) and whether a common TCI state ID is known on the CC. The delay is known for a delay of QCL-typeD RS on the CC or any other QCL-typeD RS in the CC set that contains the CC. The delay may be based on
(Continued)

that of a single CC delay, with the slot where the new TCI state applies determined based on a carrier with a smallest subcarrier spacing (SCS) in the CC or the CC set.

20 Claims, 6 Drawing Sheets

(51) Int. Cl.
*H04L 5/00* (2006.01)
*H04W 36/00* (2009.01)

(58) Field of Classification Search
CPC ................. H04L 5/0035; H04L 5/0051; H04L 27/26025; H04L 5/0098; H04L 27/261; H04L 5/0048; H04W 36/00692; H04W 72/232; H04W 24/08; H04W 72/0446; H04W 72/231
See application file for complete search history.

(56) References Cited

U.S. PATENT DOCUMENTS

2023/0112997 A1* 4/2023 Xu ........................... H04B 7/10
370/329
2024/0137087 A1* 4/2024 Bhamri .................. H04B 7/086

FOREIGN PATENT DOCUMENTS

CA 3234308 A1 * 11/2023 ......... H04B 7/15542
WO WO-2021254472 A1 * 12/2021 ............ H04W 72/23
WO WO-2022133009 A2 * 6/2022 ......... H04B 7/06964
WO WO-2022208884 A1 * 10/2022 ............ H04W 16/28
WO WO-2022217220 A1 * 10/2022 ......... H04B 7/18541
WO WO-2023014847 A1 * 2/2023 ........... H04L 5/0051
WO WO-2023154331 A1 8/2023

OTHER PUBLICATIONS

"International Application Serial No. PCT/US2023/012605, Written Opinion mailed May 30, 2023", 4 pgs.
Mediatek Inc., "Discussion on remaining issues on TCI switching", R4-1908701, 3GPP TSG-RAN WG4 #92, Ljubljana, SI, (Aug. 16, 2019), 3 pgs.
Mediatek Inc., "Enhancement on multi-beam operation", R1-2112276, 3GPP TSG-RAN WG1 #107-e, (Nov. 6, 2021), 18 pgs.
Moderator, "Email discussion summary for [101-bis-e][219] NR_feMIMO_RRM", R4-2202570, 3GPP TSG-RAN WG4 #101bis-e, (Jan. 23, 2022), 72 pgs.
Samsung, "Draft CR to introduce active TCI state switching delay requirement for FR2 HST UE", R4-2201771, 3GPP TSG-RAN WG4 #101-bis-e, (Jan. 10, 2022), 4 pgs.
"International Application Serial No. PCT US2023 012605, International Preliminary Report on Patentability mailed Aug. 22, 2024", 6 pgs.
"Korean Application Serial No. 10-2024-7023248, Amendment Filed Feb. 26, 2026", W Machine English Translation, 30 pgs.

* cited by examiner

COMMON TCI STATE FOR APPLICATION ACROSS MULTIPLE CONFIGURED COMPONENT CARRIERS IN CARRIER AGGREGATION

PRIORITY CLAIM

This application is a U.S. National Stage Filing under 35 U.S.C. 371 from International Application No. PCT/US2023/012605, filed Feb. 8, 2023 and published in English as WO 2023/154331 on Aug. 17, 2023, which claims the benefit of priority to U.S. Provisional Patent Application Ser. No. 63/309,319, filed Feb. 11, 2022, each of which is incorporated herein by reference in its entirety.

TECHNICAL FIELD

Embodiments pertain to wireless communications. In particular, some embodiments relate to carrier aggregation (CA) and Transmission Configuration Indication (TCI) switch delay.

BACKGROUND

The use and complexity of wireless systems has increased due to both an increase in the types of electronic devices using network resources as well as the amount of data and bandwidth being used by various applications, such as video streaming, operating on the electronic devices. As expected, a number of issues abound with the advent of any new technology, including complexities related to a reduction in signaling overhead, in particular overhead reduction related to quasi co-located (QCL) signals.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
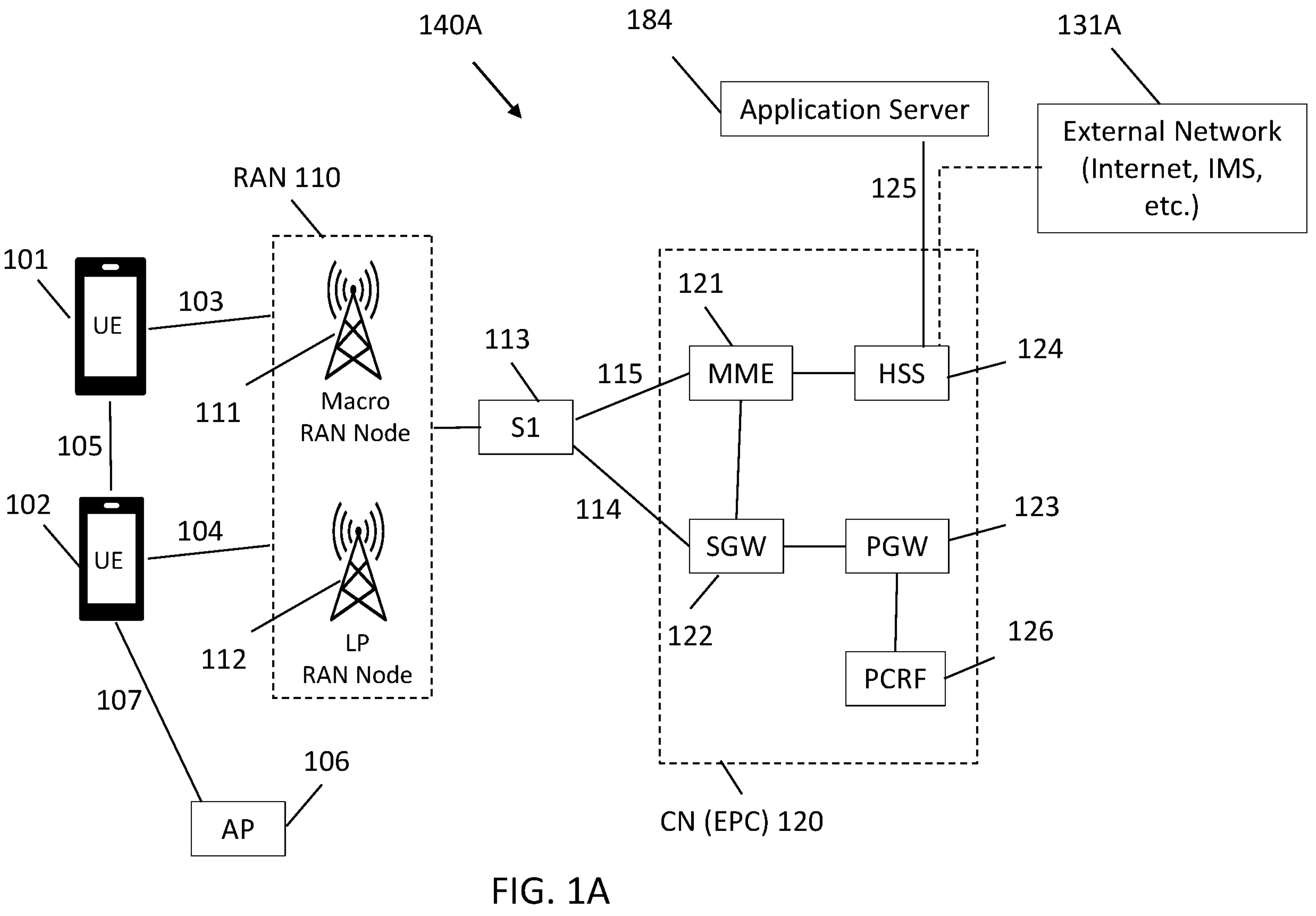
FIG. 1A illustrates an architecture of a network, in accordance with some aspects.

FIG. 1A illustrates an architecture of a network in accordance with some aspects. The network 140A includes 3GPP LTE/4G and NG network functions that may be extended to 6G and later generation functions. Accordingly, although 5G will be referred to, it is to be understood that this is to extend as able to 6G (and later) structures, systems, and functions. A network function can be implemented as a discrete network element on a dedicated hardware, as a software instance running on dedicated hardware, and/or as a virtualized function instantiated on an appropriate platform, e.g., dedicated hardware or a cloud infrastructure.

The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as portable (laptop) or desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard. Any spectrum management scheme including, for example, dedicated licensed spectrum, unlicensed spectrum, (licensed) shared spectrum (such as Licensed Shared Access (LSA) in 2.3-2.4 GHz, 3.4-3.6 GHZ, 3.6-3.8 GHz, and other frequencies and Spectrum Access System (SAS) in 3.55-3.7 GHz and other frequencies). Different Single Carrier or Orthogonal Frequency Domain Multiplexing (OFDM) modes (CP-OFDM, SC-FDMA, SC-OFDM, filter bank-based multicarrier (FBMC), OFDMA, etc.), and in particular 3GPP NR, may be used by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The RAN 110 may contain one or more gNBs, one or more of which may be implemented by multiple units. Note that although gNBs may be referred to herein, the same aspects may apply to other generation NodeBs, such as $6^{th}$ generation NodeBs- and thus may be alternately referred to as next generation NodeB (xNB).

Each of the gNBs may implement protocol entities in the 3GPP protocol stack, in which the layers are considered to be ordered, from lowest to highest, in the order Physical (PHY), Medium Access Control (MAC), Radio Link Control (RLC), Packet Data Convergence Control (PDCP), and Radio Resource Control (RRC)/Service Data Adaptation Protocol (SDAP) (for the control plane/user plane). The protocol layers in each gNB may be distributed in different units—a Central Unit (CU), at least one Distributed Unit (DU), and a Remote Radio Head (RRH). The CU may provide functionalities such as the control the transfer of user data, and effect mobility control, radio access network sharing, positioning, and session management, except those functions allocated exclusively to the DU.

The higher protocol layers (PDCP and RRC for the control plane/PDCP and SDAP for the user plane) may be implemented in the CU, and the RLC and MAC layers may be implemented in the DU. The PHY layer may be split, with the higher PHY layer also implemented in the DU, while the lower PHY layer is implemented in the RRH. The CU, DU and RRH may be implemented by different manufacturers, but may nevertheless be connected by the appropriate interfaces therebetween. The CU may be connected with multiple DUs.

The interfaces within the gNB include the E1 and front-haul (F) F1 interface. The E1 interface may be between a CU control plane (gNB-CU-CP) and the CU user plane (gNB-CU-UP) and thus may support the exchange of signalling information between the control plane and the user plane through E1AP service. The E1 interface may separate Radio Network Layer and Transport Network Layer and enable exchange of UE associated information and non-UE associated information. The E1AP services may be non UE-associated services that are related to the entire E1 interface instance between the gNB-CU-CP and gNB-CU-UP using a non UE-associated signalling connection and UE-associated services that are related to a single UE and are associated with a UE-associated signalling connection that is maintained for the UE.

The F1 interface may be disposed between the CU and the DU. The CU may control the operation of the DU over the F1 interface. As the signalling in the gNB is split into control plane and user plane signalling, the F1 interface may be split into the F1-C interface for control plane signalling between the gNB-DU and the gNB-CU-CP, and the F1-U interface for user plane signalling between the gNB-DU and the gNB-CU-UP, which support control plane and user plane separation. The F1 interface may separate the Radio Network and Transport Network Layers and enable exchange of UE associated information and non-UE associated information. In addition, an F2 interface may be between the lower and upper parts of the NR PHY layer. The F2 interface may also be separated into F2-C and F2-U interfaces based on control plane and user plane functionalities.

The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a 5G protocol, a 6G protocol, and the like.

In an aspect, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), a Physical Sidelink Broadcast Channel (PSBCH), and a Physical Sidelink Feedback Channel (PSFCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission-reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a gNB, an eNB, or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signalling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS)

Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the SI interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the CN 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G or 6G network, including 5G new radio network using communications in the licensed (5G NR) and the unlicensed (5G NR-U) spectrum. One of the current enablers of IoT is the narrowband-IoT (NB-IoT). Operation in the unlicensed spectrum may include dual connectivity (DC) operation and the standalone LTE system in the unlicensed spectrum, according to which LTE-based technology solely operates in unlicensed spectrum without the use of an "anchor" in the licensed spectrum, called MulteFire. Further enhanced operation of LTE systems in the licensed as well as unlicensed spectrum is expected in future releases and 5G systems. Such enhanced operations can include techniques for sidelink resource allocation and UE processing behaviors for NR sidelink V2X communications.

An NG system architecture (or 6G system architecture) can include the RAN 110 and a core network (CN) 120. The NG-RAN 110 can include a plurality of nodes, such as gNBs and NG-eNBs. The CN 120 (e.g., a 5G core network (5GC)) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes. In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
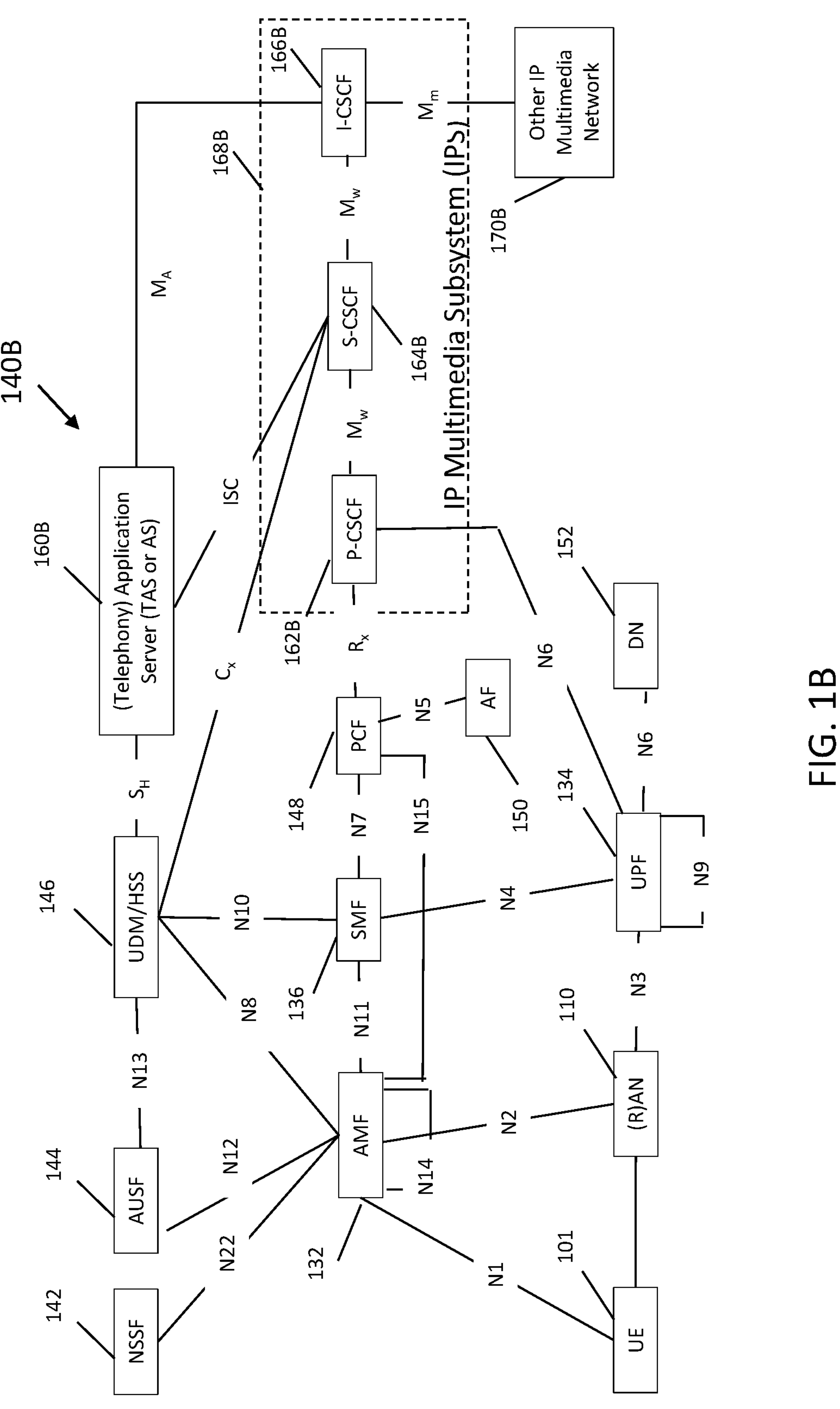
FIG. 1B illustrates a non-roaming 5G system architecture in accordance with some aspects.

FIG. 1B illustrates a non-roaming 5G system architecture in accordance with some aspects. In particular, FIG. 1B illustrates a 5G system architecture 140B in a reference point representation, which may be extended to a 6G system architecture. More specifically, UE 102 can be in communication with RAN 110 as well as one or more other CN network entities. The 5G system architecture 140B includes a plurality of network functions (NFs), such as an AMF 132, session management function (SMF) 136, policy control function (PCF) 148, application function (AF) 150, UPF 134, network slice selection function (NSSF) 142, authentication server function (AUSF) 144, and unified data management (UDM)/home subscriber server (HSS) 146.

The UPF 134 can provide a connection to a data network (DN) 152, which can include, for example, operator services, Internet access, or third-party services. The AMF 132 can be used to manage access control and mobility and can also include network slice selection functionality. The AMF 132 may provide UE-based authentication, authorization, mobility management, etc., and may be independent of the access technologies. The SMF 136 can be configured to set up and manage various sessions according to network policy. The SMF 136 may thus be responsible for session management and allocation of IP addresses to UEs. The SMF 136 may also select and control the UPF 134 for data transfer. The SMF 136 may be associated with a single session of a UE 101 or multiple sessions of the UE 101. This is to say that the UE 101 may have multiple 5G sessions. Different SMFs may be allocated to each session. The use of different SMFs may permit each session to be individually managed. As a consequence, the functionalities of each session may be independent of each other.

The UPF 134 can be deployed in one or more configurations according to the desired service type and may be connected with a data network. The PCF 148 can be configured to provide a policy framework using network slicing, mobility management, and roaming (similar to PCRF in a 4G communication system). The UDM can be configured to store subscriber profiles and data (similar to an HSS in a 4G communication system).

The AF 150 may provide information on the packet flow to the PCF 148 responsible for policy control to support a desired QoS. The PCF 148 may set mobility and session management policies for the UE 101. To this end, the PCF 148 may use the packet flow information to determine the appropriate policies for proper operation of the AMF 132 and SMF 136. The AUSF 144 may store data for UE authentication.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170B, e.g. an IMS operated by a different network operator.

In some aspects, the UDM/HSS 146 can be coupled to an application server (AS) 160B, which can include a telephony application server (TAS) or another application server. The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
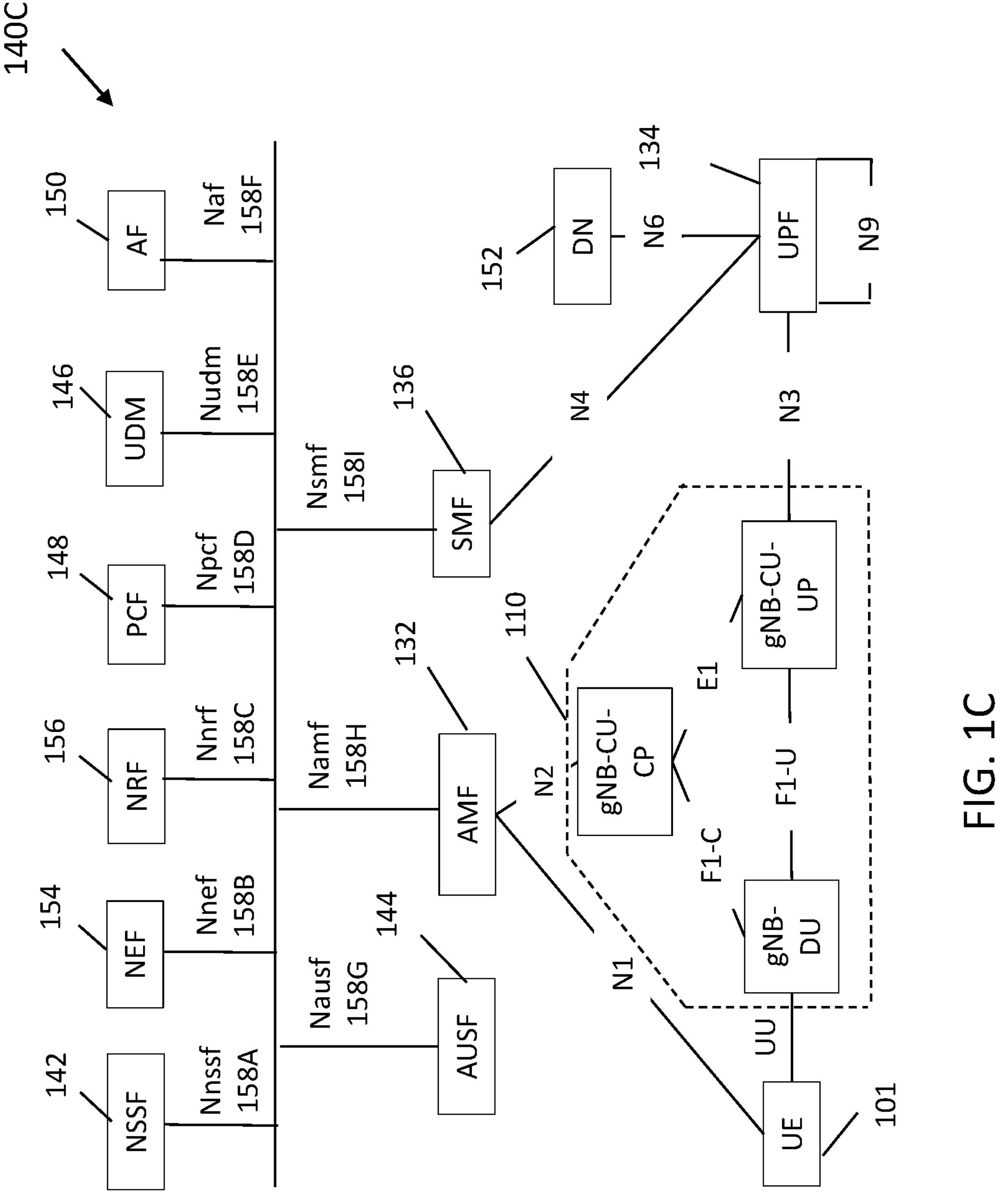
FIG. 1C illustrates a non-roaming 5G system architecture in accordance with some aspects.

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

NR-V2X architectures may support high-reliability low latency sidelink communications with a variety of traffic patterns, including periodic and aperiodic communications with random packet arrival time and size. Techniques disclosed herein can be used for supporting high reliability in distributed communication systems with dynamic topologies, including sidelink NR V2X communication systems.

Figure 2:
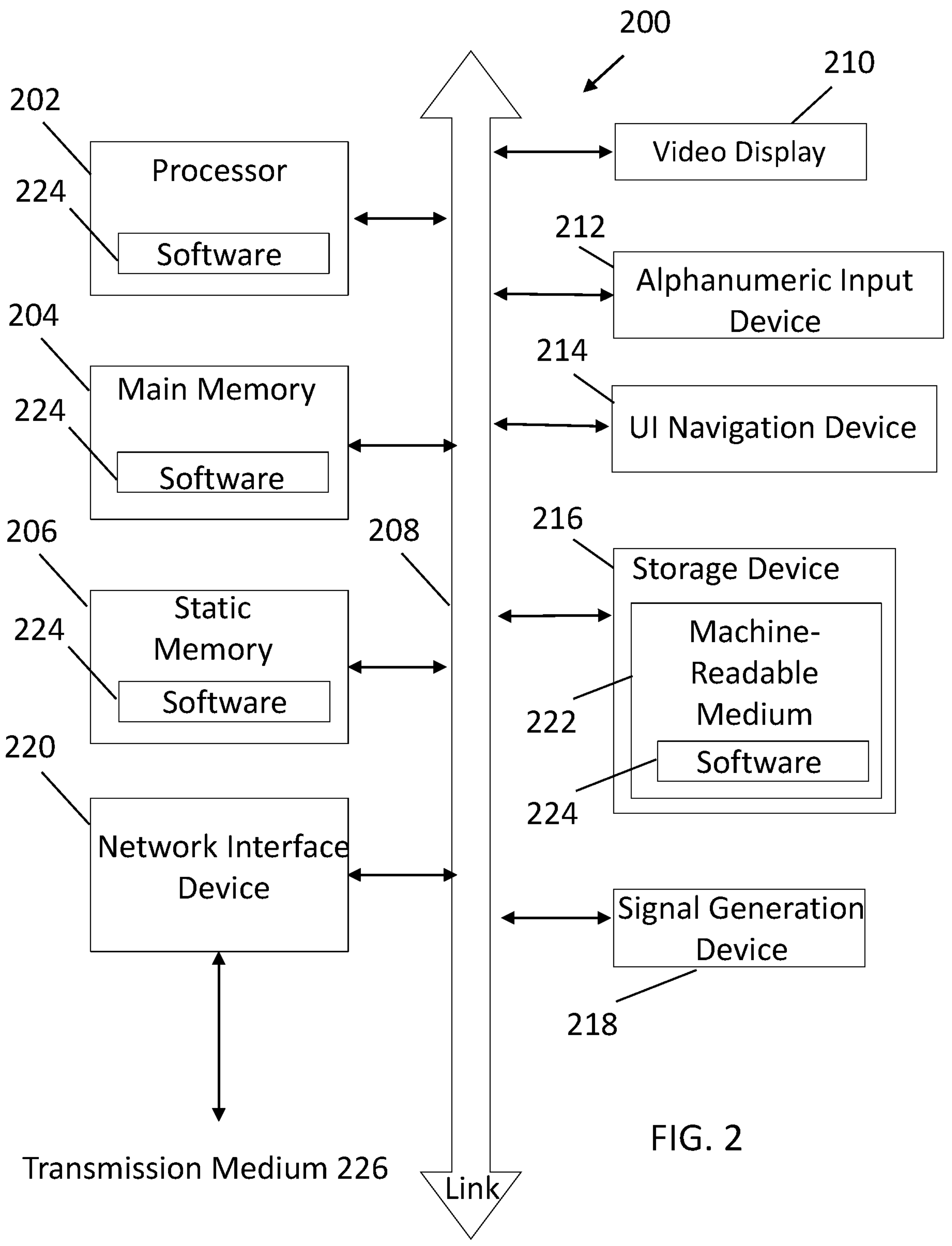
FIG. 2 illustrates a block diagram of a communication device in accordance with some embodiments.

FIG. 2 illustrates a block diagram of a communication device in accordance with some embodiments. such as an evolved Node-B (eNB), a new generation Node-B (gNB) (or another RAN node), an access point (AP), a wireless station (STA), a mobile station (MS), or user equipment (UE), in accordance with some aspects and to perform one or more of the techniques disclosed herein. In alternative aspects, the communication device 500 may operate as a standalone device or may be connected (e.g., networked) to other communication devices. The communication device may be any machine capable of executing instructions (sequential or otherwise) that specify actions to be taken by that machine. For example, the communication device 200 may be implemented as one or more of the devices shown in FIGS. 1A-1C. Note that communications described herein may be encoded before transmission by the transmitting entity (e.g., UE, gNB) for reception by the receiving entity (e.g., gNB, UE) and decoded after reception by the receiving entity.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor (or equivalently processing circuitry) 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of wireless local area network (WLAN) transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/5$^{th}$ generation (5G) standards among others. In an example, the network interface device 220 may include one or more physical jacks (e.g., Ethernet, coaxial, or phone jacks) or one or more antennas to connect to the transmission medium 226.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 5G, 5G New Radio (5G NR), 3GPP 5G New Radio, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p or IEEE 802.11bd and other) Vehicle-to-Vehicle (V2V) and Vehicle-to-X (V2X) and Vehicle-to-Infrastructure (V21) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925 MHz or above (typically up to 5935 MHz following change proposals in CEPT Report 71)), the European ITS-G5 system (i.e. the European flavor of IEEE 802.11p based DSRC, including ITS-G5A (i.e., Operation of ITS-G5 in European ITS frequency bands dedicated to ITS for safety re-lated applications in the frequency range 5,875 GHz to 5,905 GHz), ITS-G5B (i.e., Operation in European ITS frequency bands dedicated to ITS non-safety applications in the frequency range 5,855 GHz to 5,875 GHZ), ITS-G5C (i.e., Operation of ITS applications in the frequency range 5,470 GHz to 5,725 GHz)), DSRC in Japan in the 700 MHz band (including 715 MHz to 725 MHz), IEEE 802.11bd based systems, etc.

Aspects described herein can be used in the context of any spectrum management scheme including dedicated licensed spectrum, unlicensed spectrum, license exempt spectrum, (licensed) shared spectrum (such as LSA=Licensed Shared Access in 2.3-2.4 GHz, 3.4-3.6 GHZ, 3.6-3.8 GHz and further frequencies and SAS=Spectrum Access System/CBRS=Citizen Broadband Radio System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHz, 1710-2025 MHz, 2110-2200 MHz, 2300-2400 MHz, 2.4-2.4835 GHz (note: it is an ISM band with global availability and it is used by Wi-Fi technology family (11b/g/n/ax) and also by Bluetooth), 2500-2690 MHz, 698-790 MHz, 610-790 MHz, 3400-3600 MHz, 3400-3800 MHz, 3800-4200 MHz, 3.55-3.7 GHz (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively. Next generation Wi-Fi system is expected to include the 6 GHz spectrum as operating band but it is noted that, as of December 2017, Wi-Fi system is not yet allowed in this band. Regulation is expected to be finished in 2019-2020 time frame), IMT-advanced spectrum, IMT-2020 spectrum (expected to include 3600-3800 MHz, 3800-4200 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (note: this band has near-global designation for Multi-Gigabit Wireless Systems (MGWS)/WiGig. In US (FCC part 15) allocates total 14 GHz spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also implement a hierarchical application of the scheme is possible, e.g., by introducing a hierarchical prioritization of usage for different types of users (e.g., lowithmedium/high priority, etc.), based on a prioritized access to the spectrum e.g., with highest priority to tier-1 users, followed by tier-2, then tier-3, etc. users, etc.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

5G networks extend beyond the traditional mobile broadband services to provide various new services such as internet of things (IoT), industrial control, autonomous driving, mission critical communications, etc. that may have ultra-low latency, ultra-high reliability, and high data capacity requirements due to safety and performance concerns. Some of the features in this document are defined for the network side, such as APs, eNBs, NR or gNBs—note that this term is typically used in the context of 3GPP 5G and 6G communication systems, etc. Still, a UE may take this role as well and act as an AP, eNB, or gNB; that is some or all features defined for network equipment may be implemented by a UE.

As above, a number of advances continue to be made for 3GPP Rel-17, including those related to beam management for frequency range 2 (FR2) (24.25 GHz to 52.6 GHZ). Beam management is employed in 5G FR2 due to the channel characteristics in this frequency range. TCI is used to indicate where a beam for a target channel/signal (e.g., PDSCH, PDCCH, CSI-RS) is to be received by the UE. The TCI includes both a source reference signal (RS) and an QCL type to be applied. Thus, in 5G NR, a TCI state is used to establish a QCL connection between a target RS and a source RS. TCI states are configured for physical downlink control channel (PDCCH) or a physical downlink shared channel (PDSCH) to convey the QCL indication for the respective RS. For example, the gNB transmits downlink control information (DCI) scheduling a PDSCH to the UE, where the DCI indicates a TCI to be used for reception of the PDSCH. The UE accordingly sets beamforming coefficients based on the indicated TCI for receiving the PDSCH. Separate signaling may be used to indicate a PDCCH (or CSI-RS). A common beam (i.e., TCI state) may be associated with multiple channels simultaneously, including both uplink and downlink transmissions. However, the TCI state has been used for single carriers; further enhanced multiple-input multiple-output (FeMIMO) permits configuration of a common TCI state identifier (ID) for multiple component carriers (CCs) to reduce the signaling overhead. To enable such a configuration, the common TCI state switching delay requirement (i.e., a delay to switch from a previous beam indicated by a previous common TCI state to another beam indicated by the new common TCI state) for CA is defined herein.

Two antenna ports are considered to be QCL if properties of the channel over which a symbol on one antenna port is conveyed can be inferred from the channel over which a symbol on the other antenna port is conveyed. The antenna ports QCL types are defined as: QCL-TypeA (Doppler shift, Doppler spread, average delay, delay spread), QCL-TypeB (Doppler shift, Doppler spread), QCL-TypeC (Doppler shift, average delay), QCL-TypeD (Spatial Rx parameter). In FR1 QCL Types A-C and in FR2 QCL types A-D are applicable. The QCL Type D for FR2 indicates that PDCCH/PDSCH/CSI-RS (channel state information reference signals) is transmitted with the same spatial filter as the reference signal associated with that TCI. In FR2, the network can indicate a transmit beam change for a PDSCH or PDCCH by switching the TCI state.

The Rel-17 unified TCI framework supports a common TCI state ID update and activation to provide common QCL information and/or common UL TX spatial filter(s) across a set of configured CCs. This may apply to intra-band CA (and inter-band CA, although more difficult when FR2 is used due to the channel condition changes) and joint DL/UL and separate DL/UL beam indications. In a manner similar to Rel. 16, the RS in the TCI state that provides QCL-TypeA [or QCL-TypeB] is in the same CC as the target channel or RS.

The common TCI state ID implies that the same/single RS determined according to the TCI state(s) indicated by a common TCI state ID is used to provide a QCL Type-D indication and to determine a UL TX spatial filter across the set of configured CCs. In the Rel. 17 unified TCI framework, the source RS in the Rel-17 TCI state that provides QCL-TypeA or QCL-TypeB is in the same CC/bandwidth part (BWP) as the target channel or RS.

Figure 3:
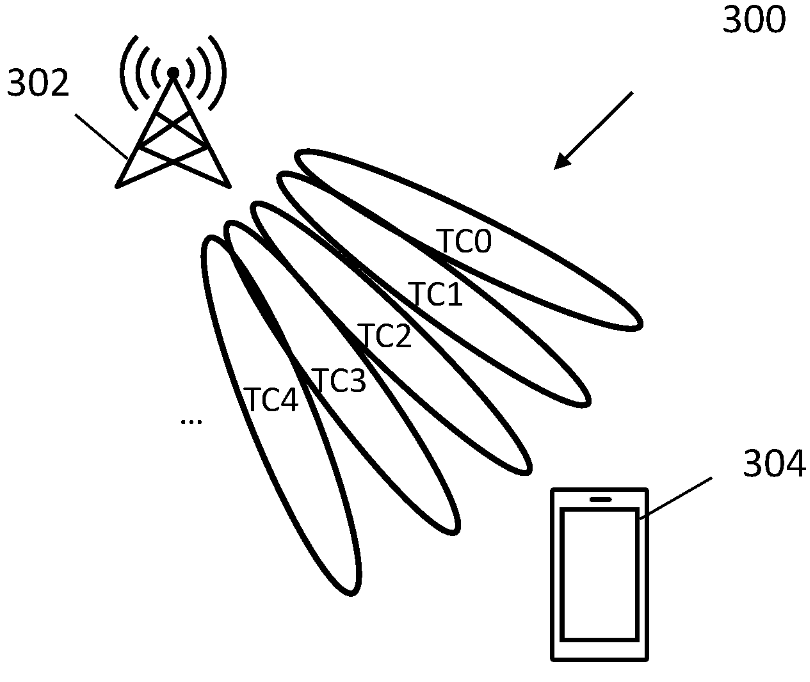
FIG. 3 illustrates reference signal transmission in accordance with some embodiments.

To define the common TCI state ID for intra-band CA: if a RS in the TCI state provides QCL-TypeD, the same/single RS is used to provide QCL Type-D information or a UL TX spatial filter for multiple CCs in intra-band CA. In real-field deployment, the system usually uses the same beams for PDSCH and PDCCH transmission in all the CCs in the same band. The gNB can configure same QCL-typeD RS in the TCI-state with same TCI-state ID in all the CCs in the same band. FIG. 3 illustrates reference signal transmission in accordance with some embodiments. As shown in the system 300 of FIG. 3, the gNB 302 may transmit RSs to a UE 304. The RSs may include TCI state that provides QCL Type-D information or a UL TX spatial filter for multiple CCs in intra-band CA.

In this case, the known condition of TCI state switching delay for intra-band CA can only consider that whether or not the QCL-typeD RS in the common TCI state ID is known on the configured CC. Known as used herein means that the UE has previously determined the parameter (which is stored in memory). The known condition is (i.e., the downlink TCI state is known if the following conditions are met):

During the period from the last transmission of the RS resource used for the L1 reference signal received power (L1-RSRP) measurement reporting for the target downlink TCI state to the completion of active downlink TCI state switch, where the RS resource for L1-RSRP measurement is the RS in target downlink TCI state or QCLed to the target downlink TCI state:

- the downlink TCI state switch command is received within 1280 ms upon the last transmission of the RS resource for beam reporting or measurement;
- the UE has sent at least 1 L1-RSRP report for the target downlink TCI state before the downlink TCI state switch command;
- the target downlink TCI state remains detectable during the downlink TCI state switching period;
- the signaling system block (SSB) associated with the downlink TCI state remains detectable during the downlink TCI switching period;
- the signal-to-noise ratio (SNR) of the downlink TCI state≥−3 dB; and the SSB can be associated with either the serving cell physical cell ID (PCI) or a PCI different from serving cell PCI.

If the RS in the common TCI state ID is unknown on the CC where the common TCI state ID is configured, another RS that is QCL-TypeD with the configured RS may have already been measured and known on another CC in the CC set. That is, the RX beam sweeping result can still be used on another CC. Therefore, the known condition can also be defined as: the common TCI state is known if any other RS in the CC set that is QCL-typeD with the configured RS is known.

If the common TCI state is known, another question is whether extra DL time tracking is to be used if the common TCI state is in the active TCI state list. Since a L1-RSRP measurement is configured per CC, the QCL-typeD RS may not be measured in some CCs and the DL timing may not be maintained. For FR2, since the maximum receive timing difference (MRTD) is 0.26 us, which does not exceed the cyclic prefix (CP), use of DL timing tracking may be avoided for other CCs where L1-RSRP is not performed before.

If the RS in the TCI state provides QCL-TypeD, similar to a DCI-based beam indication delay, a single MAC control element (MAC-CE)-based TCI state switching delay is defined for the CA case. A legacy MAC-CE-based TCI state switching delay based on single CC can be re-used. The difference is that the slot where the new TCI state applies is determined based on the carrier with the smallest subcarrier spacing (SCS) in the CC set.

If the source RS is for providing QCL-A or QCL-B, as the UE is unable to obtain a TypeA or TypeB QCL assumption from another CC, the source RS for providing QCL-A or QCL-B is still in the same CC as the target channel or RS. In this case, a MAC-CE-based TCI state switching delay of single CC can also be re-used.

MAC-CE-Based TCI State Delay

If the target TCI state is known, upon receiving a PDSCH carrying MAC-CE activation command in slot n, the UE is able to receive a UE-dedicated PDCCH/PDSCH with a target TCI state of the serving cell on which the TCI state switch occurs at the first slot that is after slot n+$T_{HARQ+}$ $$3N_{slot}^{subframe,\mu} + TO_k * (T_{first\text{-}SSB} + T_{SSB\text{-}proc})/NR \text{ slot length.}$$

The UE is able to receive a UE-dedicated PDCCH/PDSCH with the old TCI state until slot n+

$$T_{HARQ} + 3N_{slot}^{subframe,\mu} \text{ where } T_{HARQ} \text{ (in slot)}$$

is the timing between DL data transmission and acknowledgement as specified in TS 38.213.

$T_{first\text{-}SSB}$ is time to first SSB transmission after MAC CE command is decoded by the UE; The SSB shall be the QCL-TypeA or QCL-TypeC to target TCI state $T_{SSB\text{-}proc}$=2 ms;

$TO_k$=1 if target TCI state is not in the active TCI state list for PDSCH/PDCCH, 0 otherwise.

If the target TCI state is unknown, upon receiving a PDSCH carrying a MAC-CE activation command in slot n, the UE is able to receive a UE-dedicated PDCCH/PDSCH with a target TCI state of the serving cell on which the TCI state switch occurs at the first slot that is after slot n+$T_{HARQ}$ $$n + T_{HARQ} + 3N_{slot}^{subframe,\mu} + (T_{L1\text{-}RSRP} + TO_{uk} * (T_{first\text{-}SSB} + T_{SSB\text{-}proc}))/NR \text{ slot length.}$$

The UE is able to receive a UE-dedicated PDCCH/PDSCH with the old TCI state until $$\text{slot } n + T_{HARQ} + 3N_{slot}^{subframe,\mu}.$$

Where: $T_{L1\text{-}RSRP}$=0 in FR1 or when the TCI state switching not involving QCL-TypeD in FR2. Otherwise, $T_{L1\text{-}RSRP}$ is the time for Rx beam refinement in FR2, defined as $T_{L1\text{-}RSPR\_Measurement\_Period\_SSB}$ for a SSB as specified in clause 9.5.4.1, with the assumption of M=1 and with $T_{Report}$=0

$T_{L1\text{-}RSRP\_Measurement\_Period\_CSI\text{-}RS}$ for CSI-RS as specified in clause 9.5.4.2, in which a CSI-RS based L1-RSRP measurement only applies for a TCI state switch when the source RS is associated with the serving cell, is configured with higher layer parameter repetition set to ON, with the assumption of M=1 for periodic CSI-RS and for aperiodic CSI-RS if number of resources in the resource set at least equal to MaxNumberRxBeam, with $T_{Report}$=0

$TO_{uk}$=1 for CSI-RS based L1-RSRP measurement, and 0 for SSB based L1-RSRP measurement when the TCI state switching involves QCL-TypeD $TO_{uk}$=1 when the TCI state switching involves other QCL types only $T_{first\text{-}SSB}$ is the time to the first SSB transmission after L1-RSRP measurement when the TCI state switching involves QCL-TypeD;

$T_{first\text{-}SSB}$ is time to the first SSB transmission after the MAC CE command is decoded by the UE for other QCL types;

The SSB is the QCL-TypeA or QCL-TypeC to the target TCI state.

DCI Based TCI State Switching Delay

If the target TCI state is known, the downlink TCI switching to the indicated DL TCI state or joint TCI state in the DCI format is completed starting from the first slot that is at least BeamAppTime-r17 symbols after the last symbol of the PUCCH carrying HARQ-ACK in response to the DCI triggering TCI state activation. The first slot and the BeamApp Time-r17 symbols are both determined on the carrier with the smallest SCS among the carrier(s) applying the beam indication.

DCI Based TCI Switching Delay for CA

Similarly, one beam application time is configured for all the CCs configured with the common TCI state ID update. The beam indication time is determined based on the carrier with the smallest SCS among the carrier(s).

Figure 4:
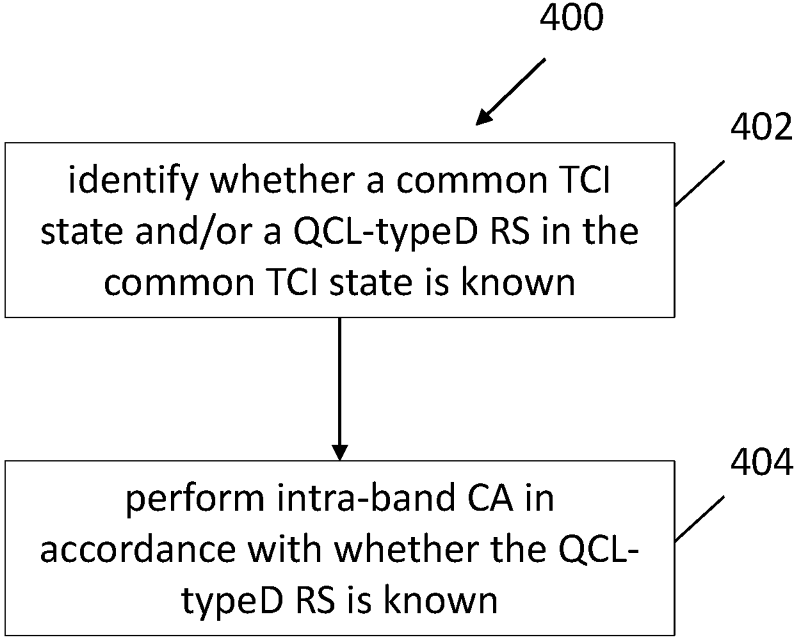
FIG. 4 illustrates reference signal transmission in accordance with some embodiments.

FIG. 4 illustrates reference signal transmission in accordance with some embodiments. The electronic device(s), network(s), system(s), chip(s) or component(s), or portions or implementations thereof, of the figures herein may be configured to perform one or more processes, techniques, or methods as described herein, or portions thereof. One such process is depicted in FIG. 4. The process 400 may be performed by a device of a cellular network (e.g., a UE or gNB). The process may include identifying, at operation 402, whether a common TCI state and/or whether a QCL-typeD RS in the common TCI state is known; and performing, at operation 404, intra-band CA in accordance with whether the QCL-typeD RS is known.

EXAMPLES

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus for a user equipment (UE) configured for operating in a fifth-generation new radio (5G NR) network), the apparatus comprising: processing circuitry; and memory, wherein the processing circuitry is configured to:

decode a downlink control information (DCI) format indicating a Transmission Configuration Indication (TCI) state switch, the TCI state switch to indicate a TCI state ID for a common TCI state to be applied across multiple configured component carriers (CCs) in carrier aggregation (CA), the common TCI state associating two downlink reference signals (DL RSs) with a quasi-colocation (QCL) type;

configure the UE to apply the common TCI state to the multiple configured CCs within a TCI state switching delay; and after application of the common TCI state to the multiple configured CCs, measure one of the two RSs to determine QCL information and apply the QCL information another of the two RSs.

2. The apparatus of claim 1, wherein the processing circuitry is configured to apply the common TCI state indicated by the TCI state ID across the multiple configured CCs for intra-band CA in which different of the multiple component carriers are used for control and data.

3. The apparatus of claim 2, wherein the TCI state ID is a common multi-CC TCI state ID to be applied for all downlink bandwidth parts (DL BWPs) in the multiple configured CCs.

4. The apparatus of claim 3 wherein the TCI state switching delay is dependent on whether the common TCI state is known or unknown.

5. The apparatus of claim 4 wherein the processing circuitry is configured to determine whether the common TCI state is known or unknown dependent on whether the QCL information is known for one of the multiple CCs.

6. The apparatus of claim 4, wherein the common TCI state is a target downlink TCI state, and wherein the processing circuitry determines that the target downlink TCI state is known if:

during a period from a last transmission of a RS resource used for L1 reference signal received power (L1-RSRP) reporting for the target downlink TCI state to completion of the TCI state switch, where the RS resource for a L1-RSRP measurement is the RS in the target downlink TCI state or QCLed to the target downlink TCI state.

7. The apparatus of claim 6 wherein the processing circuitry further determines that the target downlink TCI state is known if the TCI state switch is received within 1280 ms upon a last transmission of the RS resource for beam reporting or measurement.

8. The apparatus of claim 7 wherein the processing circuitry further determines that the target downlink TCI state is known if:

the UE has sent at least one L1-RSRP report for the target downlink TCI state before reception of the TCI state switch, the target downlink TCI state remains detectable during a downlink TCI state switching period, a signaling system block (SSB) associated with the target downlink TCI state remain detectable during the downlink TCI switching period, a signal-to-noise ratio (SNR) of the target downlink TCI state≥−3 dB, and the SSB is associated with a serving cell physical cell identity (PCI) of the serving cell or a PCI different from the serving cell PCI.

9. The apparatus of claim 4, wherein if the TCI state is known, the processing circuitry is configured to apply the TCI state to a first slot determined based on a carrier of one of the multiple CCs with a smallest subcarrier spacing (SCS).

10. The apparatus of claim 9, wherein after application of the common TCI state indicated by the TCI state ID across the multiple configured CCs, the processing circuitry is to configure the UE to transmit an uplink channel carrying Hybrid Automatic Repeat reQuest Acknowledgement (HARQ-ACK) information corresponding to the DCI indicating the TCI state switch.

11. A non-transitory computer-readable storage medium that stores instructions for execution by processing circuitry of a user equipment (UE) configured for operating in a fifth-generation new radio (5G NR) network), wherein the processing circuitry is configured to:

decode a downlink control information (DCI) format indicating a Transmission Configuration Indication (TCI) state switch, the TCI state switch to indicate a TCI state ID for a common TCI state to be applied across multiple configured component carriers (CCs) in carrier aggregation (CA), the common TCI state associating two downlink reference signals (DL RSs) with a quasi-colocation (QCL) type;

configure the UE to apply the common TCI state to the multiple configured CCs within a TCI state switching delay; and after application of the common TCI state to the multiple configured CCs, measure one of the two RSs to determine QCL information and apply the QCL information another of the two RSs.

12. The non-transitory computer-readable storage medium of claim 11, wherein the processing circuitry is configured to apply the common TCI state indicated by the TCI state ID across the multiple configured CCs for intra-band CA in which different of the multiple component carriers are used for control and data.

13. The non-transitory computer-readable storage medium of claim 12, wherein the TCI state ID is a common multi-CC TCI state ID to be applied for all downlink bandwidth parts (DL BWPs) in the multiple configured CCs.

14. The non-transitory computer-readable storage medium of claim 13 wherein the TCI state switching delay is dependent on whether the common TCI state is known or unknown.

15. The non-transitory computer-readable storage medium of claim 14 wherein the processing circuitry is configured to determine whether the common TCI state is known or unknown dependent on whether the QCL information is known for one of the multiple CCs.

16. The non-transitory computer-readable storage medium of claim 14, wherein the common TCI state is a target downlink TCI state, and wherein the processing circuitry determines that the target downlink TCI state is known if:

during a period from a last transmission of a RS resource used for L1 reference signal received power (L1-RSRP) reporting for the target downlink TCI state to completion of the TCI state switch, where the RS resource for a L1-RSRP measurement is the RS in the target downlink TCI state or QCLed to the target downlink TCI state.

17. The non-transitory computer-readable storage medium of claim 16 wherein the processing circuitry further determines that the target downlink TCI state is known if the TCI state switch is received within 1280 ms upon a last transmission of the RS resource for beam reporting or measurement.

18. The non-transitory computer-readable storage medium of claim 17 wherein the processing circuitry further determines that the target downlink TCI state is known if:

the UE has sent at least one L1-RSRP report for the target downlink TCI state before reception of the TCI state switch, the target downlink TCI state remains detectable during a downlink TCI state switching period, a signaling system block (SSB) associated with the target downlink TCI state remain detectable during the downlink TCI switching period, a signal-to-noise ratio (SNR) of the target downlink TCI state≥−3 dB, and the SSB is associated with a serving cell physical cell identity (PCI) of the serving cell or a PCI different from the serving cell PCI.

19. An apparatus for a generation Node B (gNB) configured for operating in a fifth-generation new radio (5G NR) network), the apparatus comprising: processing circuitry; and memory, wherein the processing circuitry is configured to:

encode a downlink control information (DCI) format indicating a Transmission Configuration Indication (TCI) state switch for transmission to a user equipment (UE), the TCI state switch to indicate a TCI state ID for a common TCI state to be applied across multiple configured component carriers (CCs) in carrier aggregation (CA), the common TCI state associating two downlink reference signals (DL RSs) with a quasi-colocation (QCL) type;

decode an uplink channel carrying Hybrid Automatic Repeat reQuest Acknowledgement (HARQ-ACK) information corresponding to the DCI indicating the TCI state switch, the uplink channel received from the UE after application by the UE of the common TCI state indicated by the TCI state ID across the multiple configured CCs.

20. The apparatus of claim 19, wherein the common TCI state indicated by the TCI state ID is to be applied across the multiple configured CCs for intra-band CA in which different of the multiple component carriers are used for control and data.

* * * * *